United States Patent
Hapsari et al.

(10) Patent No.: US 10,004,029 B2
(45) Date of Patent: Jun. 19, 2018

(54) MOBILE STATION, BASE STATION, RESTRICTION CONTROL METHOD, AND BROADCAST INFORMATION TRANSMISSION METHOD

(71) Applicant: NTT DOCOMO, INC., Tokyo (JP)

(72) Inventors: Wuri Andarmawanti Hapsari, Tokyo (JP); Kenichiro Aoyagi, Tokyo (JP); Shinya Takeda, Tokyo (JP); Yasuharu Konishi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days. days.

(21) Appl. No.: 15/500,971

(22) PCT Filed: Aug. 6, 2015

(86) PCT No.: PCT/JP2015/072383
§ 371 (c)(1),
(2) Date: Feb. 1, 2017

(87) PCT Pub. No.: WO2016/021691
PCT Pub. Date: Feb. 11, 2016

(65) Prior Publication Data
US 2017/0230898 A1    Aug. 10, 2017

(30) Foreign Application Priority Data

Aug. 7, 2014   (JP) ................................. 2014-161812

(51) Int. Cl.
*H04W 48/10* (2009.01)
*H04W 48/16* (2009.01)

(52) U.S. Cl.
CPC .......... *H04W 48/10* (2013.01); *H04W 48/16* (2013.01)

(58) Field of Classification Search
CPC .............................. H04W 48/10; H04W 48/16
See application file for complete search history.

(56) References Cited

U.S. PATENT DOCUMENTS

| | | |
|---|---|---|
| 9,125,137 B2 * | 9/2015 Kim | ...................... H04W 48/10 |
| 9,350,854 B2 * | 5/2016 Booton | ................... H04M 3/38 |
| 2007/0140168 A1 * | 6/2007 Laroia | ................... H04W 24/08 370/330 |

(Continued)

OTHER PUBLICATIONS

International Search Report issued in PCT/JP2015/072383 dated Oct. 27, 2015 (3 pages).

(Continued)

*Primary Examiner* — Nathan Mitchell
(74) *Attorney, Agent, or Firm* — Osha Liang LLP

(57) ABSTRACT

A mobile station for receiving broadcast information for restriction control from a base station in a network environment shared by a plurality of operators includes a reception unit configured to receive from the base station the broadcast information including restriction control skip information indicating a type of a call which is not subject to restriction control; and a restriction control determination unit configured to identify restriction control skip information corresponding to an operator with which the mobile station registers from the received broadcast information and determine whether to apply the restriction control.

4 Claims, 8 Drawing Sheets

(56) References Cited

U.S. PATENT DOCUMENTS

| | | | |
|---|---|---|---|
| 2012/0020351 A1* | 1/2012 | Booton | H04M 7/0012 |
| | | | 370/352 |
| 2013/0045706 A1 | 2/2013 | Hsu | |
| 2014/0171096 A1 | 6/2014 | Hwang et al. | |
| 2014/0315548 A1* | 10/2014 | Ramachandran | H04W 48/16 |
| | | | 455/434 |
| 2015/0223146 A1* | 8/2015 | Pinheiro | H04W 4/14 |
| | | | 370/230 |
| 2016/0066259 A1* | 3/2016 | Guo | H04W 48/02 |
| | | | 370/230 |
| 2016/0227469 A1* | 8/2016 | Kim | H04W 4/14 |
| 2016/0381623 A1* | 12/2016 | Lee | H04W 48/12 |
| | | | 455/418 |
| 2017/0013501 A1* | 1/2017 | Kim | H04W 28/0284 |
| 2017/0135028 A1* | 5/2017 | Lee | H04W 48/16 |
| 2017/0201939 A1* | 7/2017 | Lee | H04W 76/02 |

OTHER PUBLICATIONS

Written Opinion of the International Searching Authority issued in PCT/JP2015/072383 dated Oct. 27, 2015 (3 pages).

3GPP TS 36.331 V12.1.0; "3rd Generation Partnership Project; Technical Specification Group Radio Access Network; Evolved Universal Terrestrial Radio Access (E-UTRA); Radio Resource Control (RRC); Protocol Specification (Release 12)"; Mar. 2014 (356 pages).

3GPP TS 23.251 V12.1.0; "3rd Generation Partnership Project; Technical Specification Group Services and System Aspects; Network Sharing; Architecture and functional description (Release 12)"; Jun. 2014 (35 pages).

3GPP TSG-RAN WG2 #86; Tdoc R2-142511; Ericsson; "Introduction of bypass of ACB"; Seoul, South Korea; May 19-23, 2014 (3 pages).

3GPP TSG GERAN Meeting #51; GP-111484; GERAN; "Reply LS on the introduction of Full-MOCN-GERAN feature" (Release 11); Goteborg, Sweden; Aug. 30-Sep. 1, 2011 (2 pages).

Office Action issued in corresponding Japanese Application No. 2014-161812 dated Oct. 20, 2015 (5 pages).

Office Action issued in corresponding Japanese Application No. 2014-161812 dated May 31, 2016 (5 pages).

Extended European Search Report issued in corresponding European Patent Application No. 15829259.9, dated Jul. 17, 2017 (10 pages).

NTT DOCOMO, INC., "Remaining low priority issues on ACB-skip mechanism," 3GPP TSG-RAN2 #86, R2-142493, Seoul, Korea, May 19-23, 2014 (3 pages).

* cited by examiner

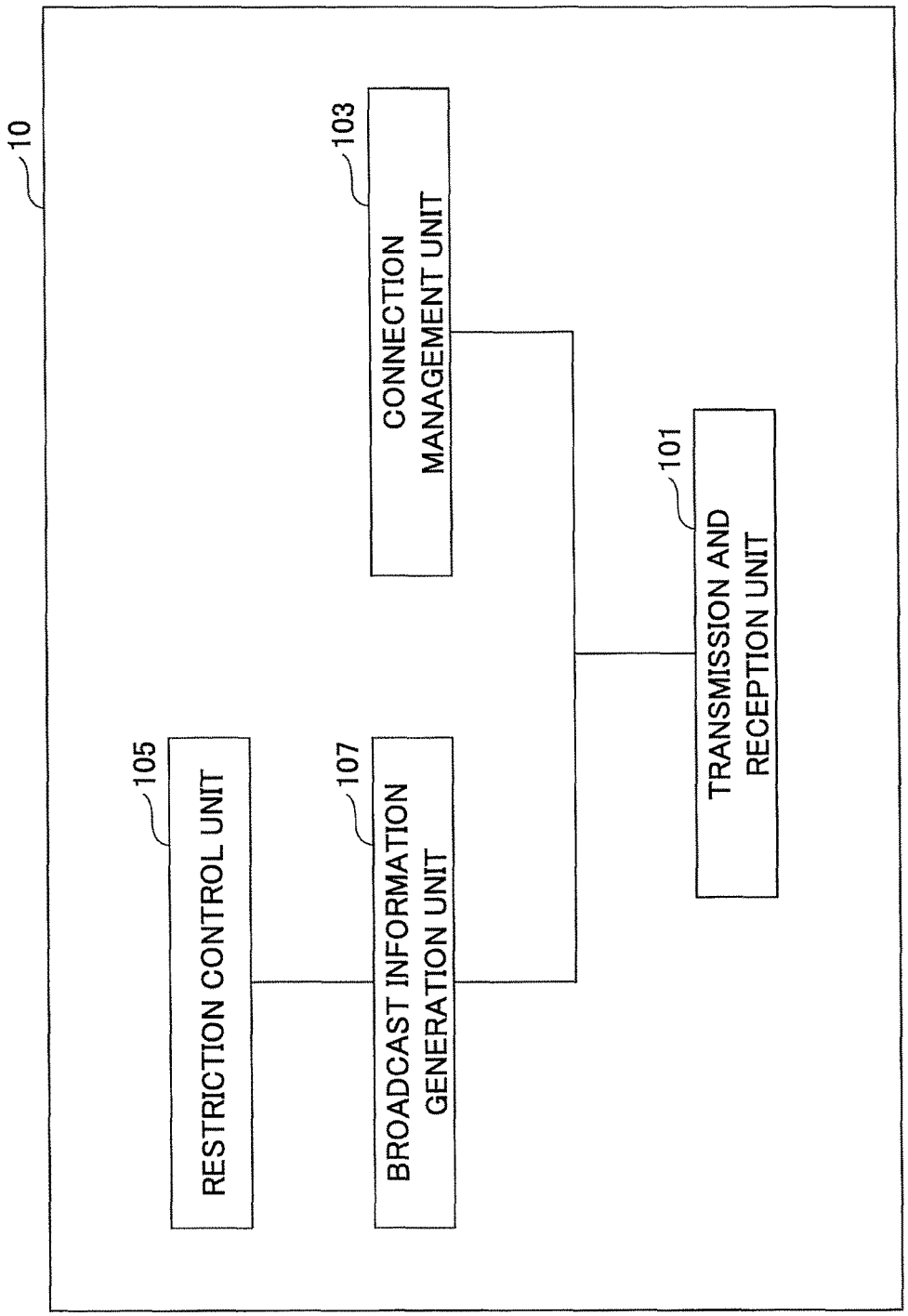

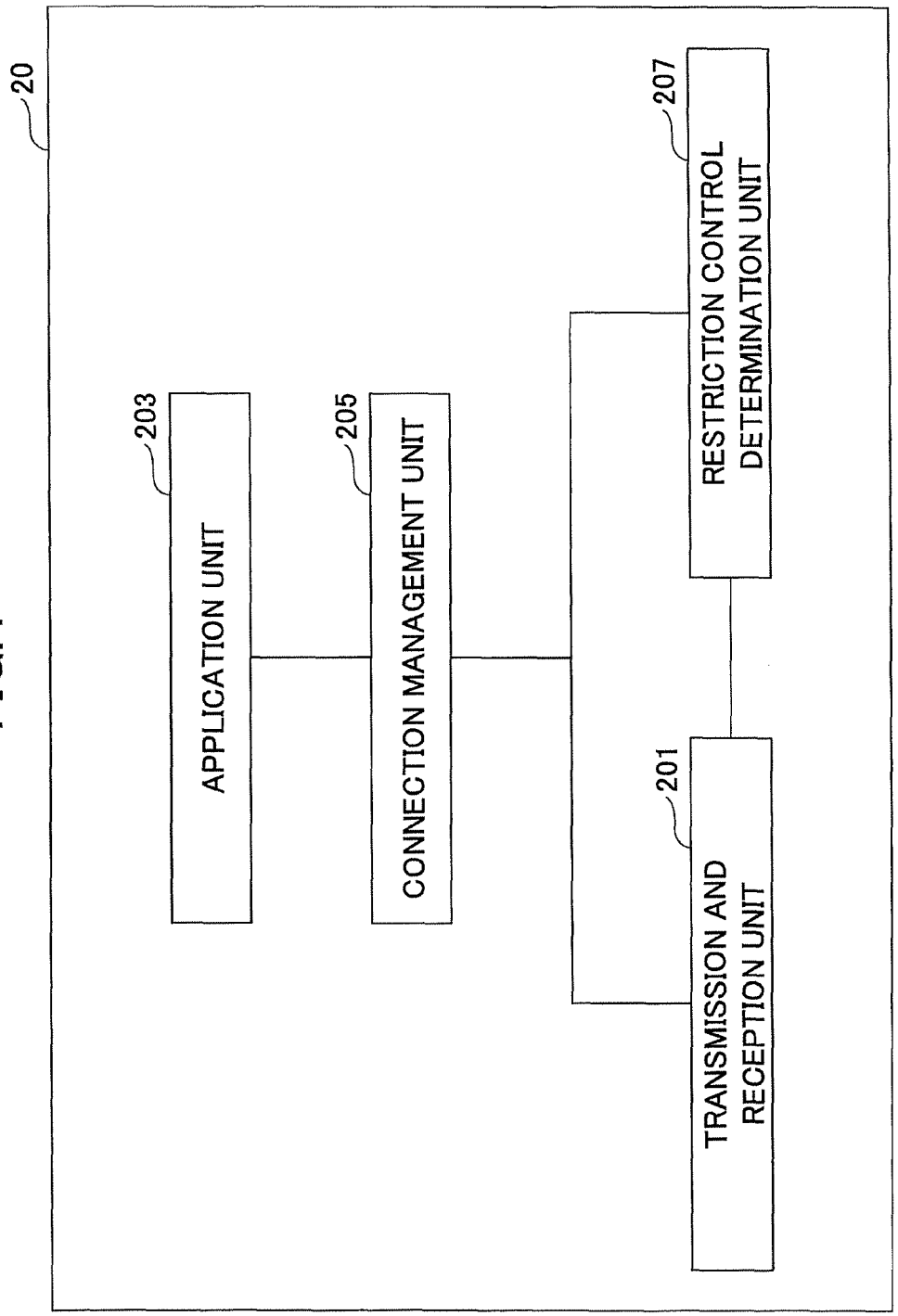

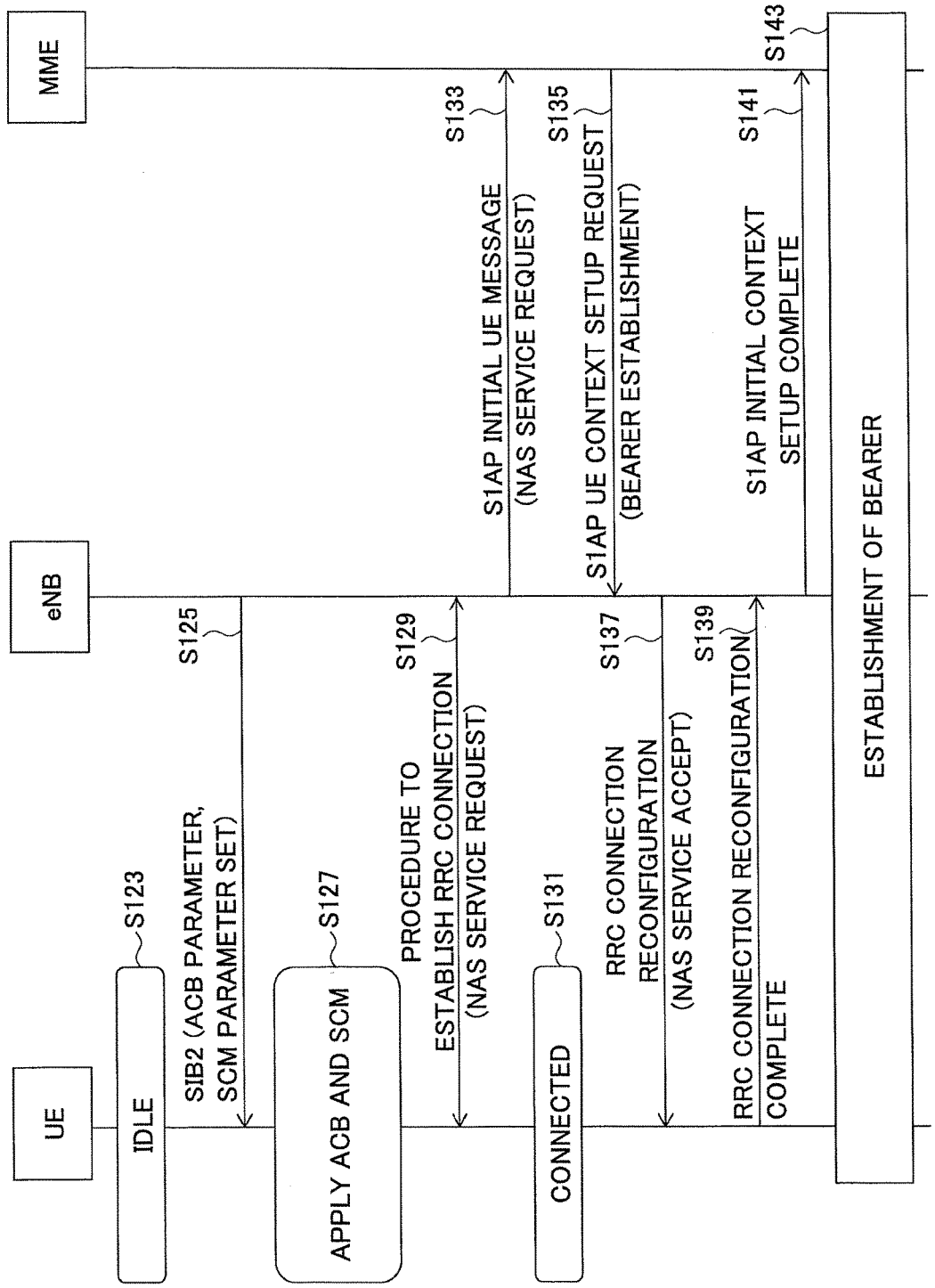

FIG.7

```
-- ASN1START

SystemInformationBlockType2 ::=        SEQUENCE {
    ac-BarringInfo                         SEQUENCE {
        ac-BarringForEmergency                 BOOLEAN,
        ac-BarringForMO-Signalling             AC-BarringConfig              OPTIONAL,  -- Need OP
        ac-BarringForMO-Data                   AC-BarringConfig              OPTIONAL   -- Need OP
    }                                                                        OPTIONAL,  -- Need OP
    radioResourceConfigCommon              RadioResourceConfigCommonSIB,
    ue-TimersAndConstants                  UE-TimersAndConstants,
    freqInfo                               SEQUENCE {
        ul-CarrierFreq                         ARFCN-ValueEUTRA              OPTIONAL,  -- Need OP
        ul-Bandwidth                           ENUMERATED {n6, n15, n25, n50, n75, n100}
                                                                             OPTIONAL,  -- Need OP
        additionalSpectrumEmission             AdditionalSpectrumEmission
    },
    mbsfn-SubframeConfigList               MBSFN-SubframeConfigList          OPTIONAL,  -- Need OR
    timeAlignmentTimerCommon               TimeAlignmentTimer,
    ....
    lateNonCriticalExtension       OCTET STRING (CONTAINING SystemInformationBlockType2-v8h0-IEs)
                OPTIONAL,
    [[  ssac-BarringForMMTEL-Voice-r9         AC-BarringConfig               OPTIONAL,  -- Need OP
        ssac-BarringForMMTEL-Video-r9         AC-BarringConfig               OPTIONAL   -- Need OP
    ]],
    [[  ac-BarringForCSFB-r10                 AC-BarringConfig               OPTIONAL   -- Need OP
    ]],
    [[  scm-Parameter-r12                     CHOICE {
            scm-ParameterSetCommon-r12            SCM-ParameterSet
            scm-ParameterSetList-r12              SEQUENCE (SIZE (1..maxPLMN-r11)) OF SCM-ParameterSet
        }                                                                    OPTIONAL,  -- Need OR
    ]]
}

SCM-ParameterSet ::=           SEQUENCE {
    accessEnableForMMTELVoice-r12    ENUMERATED {true}      OPTIONAL,  -- Need OR
    accessEnableForMMTELVideo-r12    ENUMERATED {true}      OPTIONAL,  -- Need OR
    accessEnableForSMS-r12           ENUMERATED {true}      OPTIONAL   -- Need OR
}

SystemInformationBlockType2-v8h0-IEs ::=   SEQUENCE {
    multiBandInfoList              SEQUENCE (SIZE (1..maxMultiBands)) OF AdditionalSpectrumEmission
    OPTIONAL,   -- Need OR
    nonCriticalExtension           SystemInformationBlockType2-v9e0-IEs  OPTIONAL
}

SystemInformationBlockType2-v9e0-IEs ::= SEQUENCE {
    ul-CarrierFreq-v9e0                ARFCN-ValueEUTRA-v9e0         OPTIONAL,  -- Cond ul-FreqMax
    nonCriticalExtension               SEQUENCE {}                   OPTIONAL
}

AC-BarringConfig ::=           SEQUENCE {
    ac-BarringFactor                   ENUMERATED {
                                           p00, p05, p10, p15, p20, p25, p30, p40,
                                           p50, p60, p70, p75, p80, p85, p90, p95},
    ac-BarringTime                     ENUMERATED {s4, s8, s16, s32, s64, s128, s256, s512},
    ac-BarringForSpecialAC             BIT STRING (SIZE(5))
}

MBSFN-SubframeConfigList ::=   SEQUENCE (SIZE (1..maxMBSFN-Allocations)) OF MBSFN-
SubframeConfig

-- ASN1STOP
```

MOBILE STATION, BASE STATION, RESTRICTION CONTROL METHOD, AND BROADCAST INFORMATION TRANSMISSION METHOD

TECHNICAL FIELD

The present invention relates to a mobile station, a base station, a restriction control method, and a broadcast information transmission method.

BACKGROUND ART

At present, mobile phones and smart phones are widespread. With increasing use of mobile phones and smart phones, resources in a base station (eNB: evolved Node B) or a core network may become insufficient due to simultaneous outgoing calls from mobile stations (UE: User Equipment) and congestion may occur. Thus, restriction control is introduced into an LTE (Long Term Evolution) network to restrict an access request from a mobile station.

According to typical restriction control, an access class (AC) is assigned to every mobile station camping on a base station and transmission of a connection request signal from a mobile station is controlled based on the access class. For example, the base station transmits an access class for restriction control and a restriction control parameter (a restriction rate, a restriction time, or the like) as broadcast information (SIB2: System Information Block 2) to the mobile station. When the mobile station receives the broadcast information, the mobile station determines whether the mobile station is subject to restriction control and stops a request for connection to the base station when the mobile station is subject to restriction control (see 3GPP TS 36.331, V12.1.0 (2014-03)).

In 3GPP (The 3rd Generation Partnership Project), four types of restriction control: ACB (Access Class Barring), SSAC (Service Specific Access Control), ACB for CSFB, and EAB (Extended Access Barring) are defined. ACB is restriction control for every packet call and is triggered to reduce congestion on resources in radio (eNB) or an MME/S-GW (Mobility Management Entity/Serving Gateway). SSAC is restriction control for MMTEL Voice (VoLTE: Voice over LTE) and MMTEL Video and is triggered to reduce congestion on resources in radio (eNB) and an IMS (IP Multimedia Subsystem) node. ACB for CSFB is restriction control for CSFB (Circuit Switched Fall Back) calls and is triggered to reduce congestion on resources in radio (eNB) caused by the CSFB calls. EAB is restriction control for MTC (Machine Type Communication) terminals and is triggered to reduce congestion on resources in radio (eNB) caused by the MTC terminals.

DISCLOSURE OF INVENTION

Problem(s) to be Solved by the Invention

Packet data include packets for various services such as a best effort packet (web browsing or the like), a voice packet (MMTEL Voice or VoLTE, MMTEL Video, or the like), an IMS service packet (SMS (Short Message Service), RCS (Rich Communication Suite), or the like), and a packet for a disaster message board.

According to the current restriction control, when ACB is triggered, every data packet is subject to restriction control. Thus, not only a best effort packet is restricted, but also a voice packet, an IMS packet, and so on are also restricted. As a result, a voice packet, an IMS packet, and so on are not prioritized.

Although SSAC is defined for MMTEL data (MMTEL Voice and MMTEL Video), MMTEL data are also subject to ACB restriction control. Thus, when ACB is triggered, a voice packet, an IMS packet, and so on are not prioritized.

In order to solve this problem, a technique called SCM (Smart Congestion Mitigation) is under discussion, which defines a type of a call which is not subject to ACB (skips ACB) even if ACB is triggered. According to SCM, a mobile station which receives an SCM parameter indicating a type of a call which is not subject to ACB does not perform ACB for a call corresponding to the SCM parameter, and thus the call can be prioritized.

On the other hand, in 3GPP, sharing a radio access network (RAN) or a core network (CN) among a plurality of operators is under discussion (see 3GPP TS 23.251, V12.1.0 (2014-06)). This network environment is referred to as a "network sharing environment".

FIGS. 1A and 1B are conceptual diagrams illustrating a network sharing environment. As shown in FIG. 1A, an environment in which a CN and a RAN are shared by a plurality of operators is referred to as "GWCN (Gateway Core Network) sharing". In other words, in GWCN sharing, a base station (eNB) and an MME/S-GW are shared by a plurality of operators. As shown in FIG. 1B, an environment in which a CN is possessed by each operator and a RAN is shared by a plurality of operators is referred to as MOCN (Multi Operator Core Network) sharing". In other words, in MOCN sharing, an MME/S-GW is possessed by each operator and a base station (eNB) is shared by a plurality of operators.

In these network sharing environments, there is a need to change a policy for restriction control depending on an operator or to apply restriction control which is common to operators. However, the current restriction control does not assume a network sharing environment. Thus, when ACB is triggered, it is not possible to define a type of a call which is not subject to ACB either independently by each of a plurality of operators or in common by the plurality of operators.

It is an object of the present invention to apply restriction control in a network sharing environment either independently by each of a plurality of operators or in common by the plurality of operators.

Means for Solving the Problem(s)

In one aspect of the present invention, there is provided a mobile station for receiving broadcast information for restriction control from a base station in a network environment shared by a plurality of operators, including:

a reception unit configured to receive from the base station the broadcast information including restriction control skip information indicating a type of a call which is not subject to restriction control; and a restriction control determination unit configured to identify restriction control skip information corresponding to an operator with which the mobile station registers from the received broadcast information and determine whether to apply the restriction control.

In another aspect of the present invention, there is provided a restriction control method in a mobile station for receiving broadcast information for restriction control from a base station in a network environment shared by a plurality of operators, including the steps of:

receiving from the base station the broadcast information including restriction control skip information indicating a type of a call which is not subject to restriction control; and identifying restriction control skip information corresponding to an operator with which the mobile station registers from the received broadcast information and determining whether to apply the restriction control.

In another aspect of the present invention, there is provided a base station for transmitting broadcast information for restriction control to a mobile station in a network environment shared by a plurality of operators, including:

a broadcast information generation unit configured to generate the broadcast information including restriction control skip information indicating a type of a call which is not subject to restriction control for each of the plurality of operators; and a transmission unit configured to transmit the generated broadcast information.

In another aspect of the present invention, there is provided a base station for transmitting broadcast information for restriction control to a mobile station in a network environment shared by a plurality of operators, including:

a broadcast information generation unit configured to generate the broadcast information including restriction control skip information indicating a type of a call which is not subject to restriction control, the restriction control skip information being applied in common to the plurality of operators; and a transmission unit configured to transmit the generated broadcast information.

In another aspect of the present invention, there is provided a broadcast information transmission method in a base station for transmitting broadcast information for restriction control to a mobile station in a network environment shared by a plurality of operators, including the steps of:

generating the broadcast information including restriction control skip information indicating a type of a call which is not subject to restriction control for each of the plurality of operators; and transmitting the generated broadcast information.

In another aspect of the present invention, there is provided a broadcast information transmission method for transmitting broadcast information for restriction control to a mobile station in a network environment shared by a plurality of operators, including the steps of:

generating the broadcast information including restriction control skip information indicating a type of a call which is not subject to restriction control, the restriction control skip information being applied in common to the plurality of operators; and transmitting the generated broadcast information.

Advantageous Effect of the Invention

According to the present invention, it is possible to apply restriction control in a network sharing environment either independently by each of a plurality of operators or in common by the plurality of operators.

BRIEF DESCRIPTION OF THE DRAWINGS

FIG. 2 is a block diagram of a base station in accordance with an embodiment of the present invention.

FIG. 4 is a block diagram of a mobile station in accordance with an embodiment of the present invention.

FIG. 6 is a second sequence diagram illustrating a restriction control method in a network sharing environment.

FIG. 7 is a diagram illustrating an example of broadcast information for providing an SCM parameter list.

DETAILED DESCRIPTION OF THE PREFERRED EMBODIMENTS

Embodiments of the present invention are described below with reference to the drawings.

In an embodiment of the present invention, in a network sharing environment, a base station for defining and transmitting restriction control skip information indicating a type of a call which is not subject to restriction control and a mobile station for receiving the restriction control skip information and determining whether to apply restriction control are described.

Figure 1A:
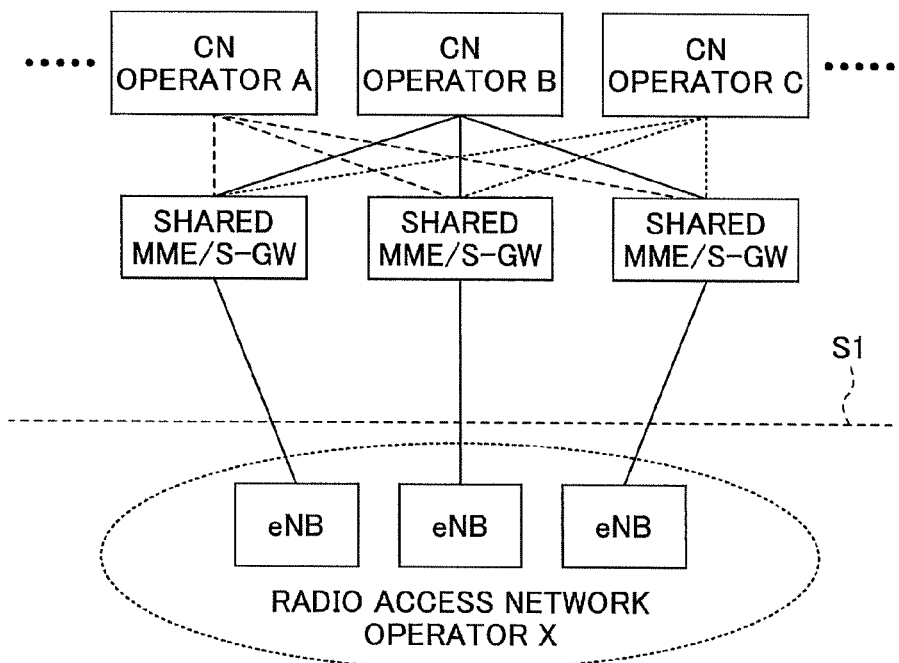
FIG. 1A is a conceptual diagram illustrating a network sharing environment (GWCN sharing).
Figure 1B:
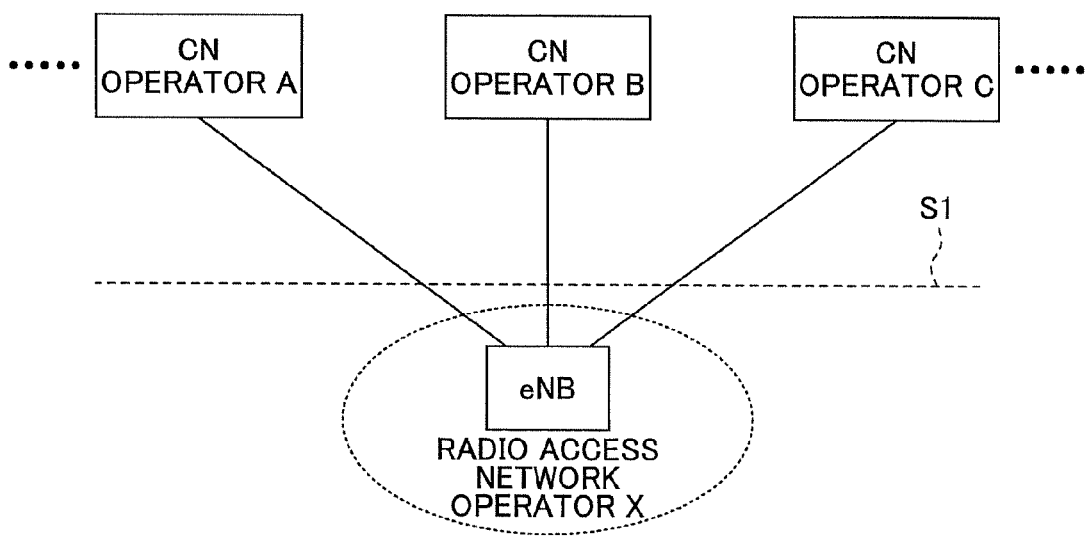
FIG. 1B is a conceptual diagram illustrating a network sharing environment (MOCN sharing).

As described with reference to FIGS. 1A and 1B, in a network sharing environment, a CN or a RAN is shared by a plurality of operators. A base station defines restriction control skip information to be applied to each of the plurality of operators or restriction control skip information to be applied in common to the plurality of operators, includes the restriction control skip information in broadcast information, and transmits the broadcast information to a mobile station. The restriction control skip information may be an ACB skip bit indicating a type of a call to which ACB is not applied. When the mobile station receives the broadcast information, the mobile station identifies restriction control skip information corresponding to an operator with which the mobile station registers and determines whether to apply restriction control.

In the following embodiments, a configuration and an operation of a radio communication system including the base station and the mobile station are described in detail.

<Configuration of a Base Station>

FIG. 2 is a block diagram of a base station in accordance with an embodiment of the present invention. The base station 10 in accordance with the embodiment of the present invention includes a transmission and reception unit 101, a connection management unit 103, a restriction control unit 105, and a broadcast information generation unit 107.

The transmission and reception unit 101 transmits and receives signals to and from a mobile station. The signals transmitted to and received from the mobile station include a message to establish a connection with the mobile station and so on. The signals transmitted to the mobile station include broadcast information about restriction control. In a network sharing environment, the broadcast information includes a list (PLMN (Public Land Mobile Network) ID list) of identifiers indicating a plurality of operators sharing the network and a restriction control parameter (for example, an ACB parameter indicating a restriction rate, a restriction time, or the like, and an ACB skip bit indicating a type of a call to which ACB is not applied).

The connection management unit 103 establishes a connection with a mobile station which transmits a connection request signal (RRC Connection Request). In a network sharing environment, when the connection management unit 103 receives an attach request (NAS Attach Request) or a location registration (TAU: Tracking Area Update) from the mobile station after the connection request signal is received from the mobile station, the connection management unit 103 receives from an MME an R-PLMN (Registered PLMN) ID indicating an operator with which the mobile station registers, and provides the R-PLMN ID to the mobile station in a response signal (Attach Accept or TAU Accept). In this manner, a connection is established between the mobile station and the network of the operator with which the mobile station registers in the network sharing environment.

The restriction control unit 105 applies restriction control for restricting an access request from a mobile station. For example, the restriction control unit 105 tracks the state of the network and applies ACB to restrict a packet call from a mobile station when the network is in a congestion state.

The broadcast information generation unit 107 generates broadcast information to be transmitted to a mobile station. The broadcast information may be divided into a plurality of information blocks, for example, into a master information block (MIB) indicating information needed to receive system information, a plurality of system information blocks SIB1-SIB13, and so on. The broadcast information generation unit 107 may include a list (PLMN ID list) of identifiers indicating a plurality of operators sharing the network in the SIB1 (System Information Block 1). The broadcast information generation unit 107 may also include a restriction control parameter (for example, an ACB parameter or an ACB skip bit) in the SIB2 in the broadcast information. The PLMN ID list and the restriction control parameter may be included in another information block in the broadcast information.

The ACB skip bit may be expressed as a bit indicating whether to apply ACB for each type of a call (for example, "1" indicates that ACB is not applied and "0" indicates that ACB is applied). Since the ACB skip bit represents a bit indicating a type of a call to which ACB is applied according to SCM, the ACB skip bit is also referred to as an "SCM parameter set". The SCM parameter set may be expressed as three bits indicating whether MMTEL Voice, MMTEL Video, and SMS are subject to ACB respectively. For example, when ACB is not applied to MMTEL Voice, ACB is applied to MMTEL Video, and ACB is applied to SMS, the SCM parameter set may be expressed as "100". It should be noted that three or more types of calls may be determined as calls to which ACB is not applied.

In order to apply restriction control independently by each of the plurality of operators sharing the network, an SCM parameter set may be defined for each operator. On the other hand, in order to apply restriction control in common to the plurality of operators sharing the network, one SCM parameter set may be defined, or an SCM parameter set defined for each operator and an SCM parameter set which is common to the plurality of operators may be defined.

Figure 3A:
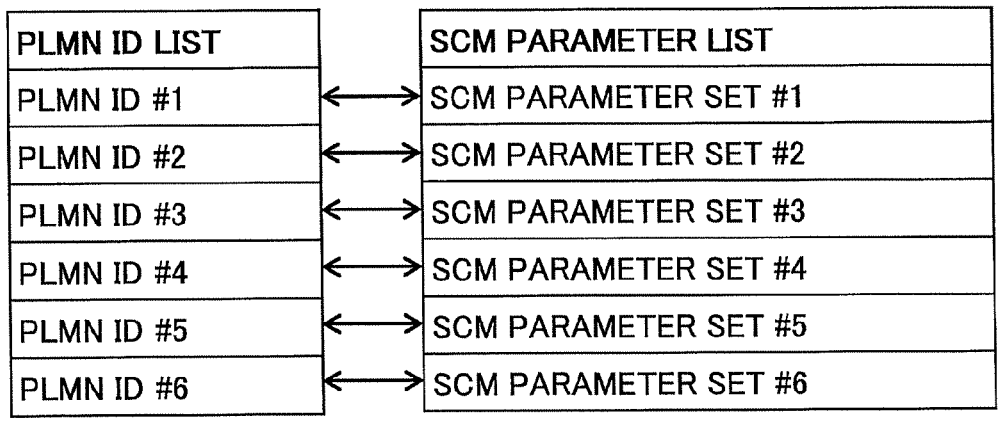
FIG. 3A is a diagram illustrating a relationship between a PLMN ID list and an SCM parameter list in a network sharing environment (an example where there is a one-to-one relationship between PLMN IDs and SCM parameters).
Figure 3B:
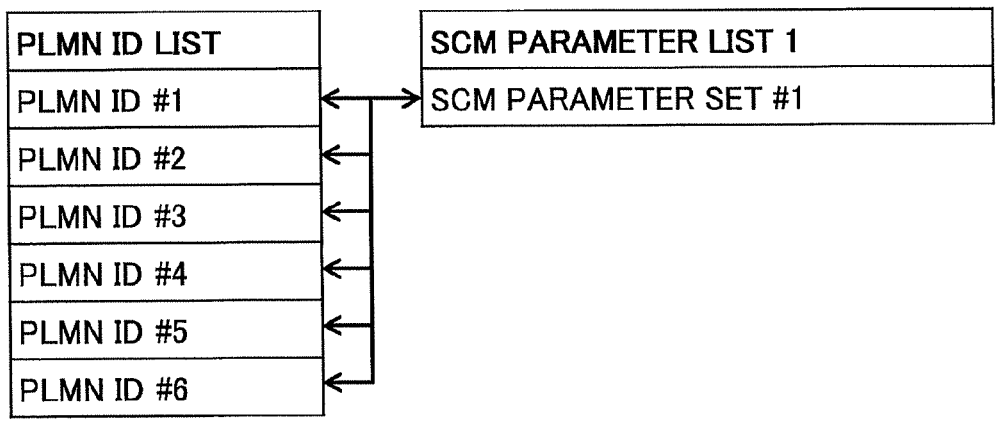
FIG. 3B is a diagram illustrating a relationship between a PLMN ID list and an SCM parameter list in a network sharing environment (an example where there is an N-to-one relationship between PLMN IDs and SCM parameters).
Figure 3C:
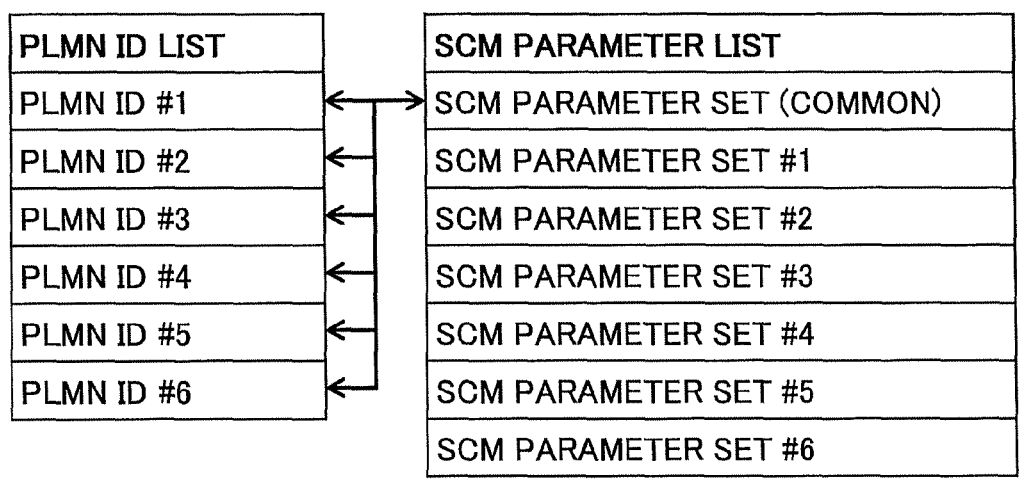
FIG. 3C is a diagram illustrating a relationship between a PLMN ID list and an SCM parameter list in a network sharing environment (an example where a SCM parameter common to a plurality of PLMNs is defined).

FIGS. 3A-3C are diagrams illustrating a relationship between a PLMN ID list and an SCM parameter list in a network sharing environment.

FIG. 3A shows a PLMN ID list and an SCM parameter list used to apply restriction control independently by each of a plurality of network operators sharing the network. The PLMN ID list (PLMN ID #1-PLMN ID #6) is a list of identifiers of operators sharing the network. The first ID (PLMN ID #1) in the PLMN ID list is referred to as a "primary PLMN" and typically indicates an operator which provides an infrastructure (RAN). SCM parameter sets (SCM parameter set #1-SCM parameter set #6) may be defined with one-to-one correspondence to the PLMN IDs. The order of the SCM parameter list may correspond to the order of the PLMN ID list. For example, a mobile station which registers with the operator of PLMN ID #1 applies the SCM parameter set #1.

FIG. 3B shows a PLMN ID list and an SCM parameter list used to apply restriction control in common to a plurality of operators sharing the network. To apply restriction control in common to the plurality of operators, only one SCM parameter set #1 may be defined. A mobile station applies the SCM parameter set #1 regardless of an operator with which the mobile station registers.

FIG. 3C shows a PLMN ID list and an SCM parameter list used to apply restriction control in common to a plurality of operators sharing the network. To apply restriction control in common to the plurality of operators, a common SCM parameter set may be defined in addition to an SCM parameter set #1 to an SCM parameter set #6. When the common SCM parameter set is defined, the common SCM parameter set may be prioritized by a mobile station over the SCM parameter set #1 to the SCM parameter set #6.

<Configuration of a Mobile Station>

FIG. 4 is a block diagram of a mobile station in accordance with an embodiment of the present invention. The mobile station 20 in accordance with the embodiment of the present invention includes a transmission and reception unit 201, an application unit 203, a connection management unit 205, and a restriction control determination unit 207.

The transmission and reception unit 201 transmits and receives signals to and from a base station. The signals transmitted to and received from the base station include a message to establish a connection with the base station and so on. The signals received from the base station include broadcast information about restriction control. As described above, in a network sharing environment, the broadcast information includes a list (PLMN ID list) of identifiers indicating a plurality of operators sharing the network and a restriction control parameter (for example, an ACB parameter and an ACB skip bit).

The application unit 203 controls a service implemented in the mobile station 20. For example, the application unit 203 notifies the connection management unit 205 of origination and termination of a call associated with start and end of the service.

Based on the notification of origination of a call from the application unit 203, the connection management unit 205 transmits a connection request signal to the base station to attempt establishment of a connection, when the call is not subject to restriction control. When the call is subject to restriction control, the connection management unit 205 does not transmit a connection request signal to the base station.

The restriction control determination unit 207 determines whether to apply restriction control upon origination of a call. When broadcast information indicating that ACB is triggered is received, the restriction control determination unit 207 applies ACB restriction control according to an ACB parameter (a restriction rate, a restriction time, or the like) corresponding to an access class assigned to the mobile station. However, when an SCM parameter set is received, restriction control is not applied depending on the type of the call. Specifically, the restriction control determination unit 207 does not apply ACB according to the SCM parameter set when the call is the type of the call to which ACB is not applied.

In a network sharing environment, the restriction control determination unit 207 identifies an SCM parameter set corresponding to the operator with which the mobile station registers and determines whether to apply restriction control. As described above, the mobile station receives an R-PLMN ID indicating the operator with which the mobile station registers via the base station from the MME upon an attach or a location registration. As shown in FIG. 3A, when broadcast information including SCM parameters with one-to-one correspondence to PLMN IDs is received, the restriction control determination unit 207 identifies an SCM parameter set corresponding to the R-PLMN ID and determines whether the call is the type of the call to which ACB is not applied.

As shown in FIG. 3B or 3C, when broadcast information including a common SCM parameter set is received, the restriction control determination unit 207 identifies the common SCM parameter set and determines whether the call is the type of the call to which ACB is not applied. Specifically, as shown in FIG. 3B, when broadcast information including only one SCM parameter set is received, the restriction control determination unit 207 identifies the SCM parameter set regardless of the operator with which the mobile station registers and determines whether the call is the type of the call to which ACB is not applied. As shown in FIG. 3C, when broadcast information including a common SCM parameter set is received, the restriction control determination unit 207 identifies the common SCM parameter set and determines whether the call is the type of the call to which ACB is not applied.

<Operations of a Base Station and a Mobile Station>

Figure 5:
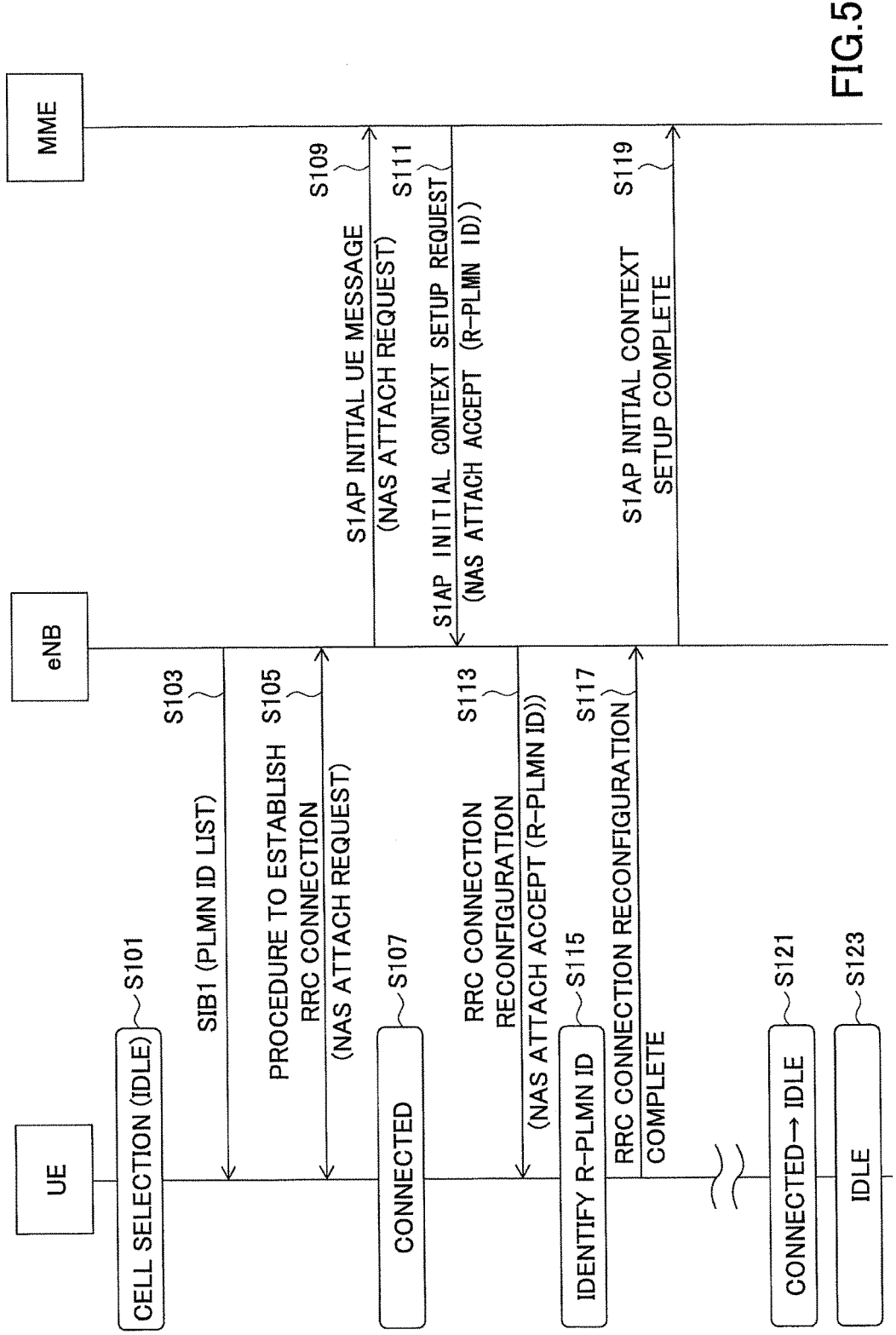
FIG. 5 is a first sequence diagram illustrating a restriction control method in a network sharing environment.

FIGS. 5 and 6 are sequence diagrams illustrating a restriction control method in a network sharing environment.

First, a mobile station (UE) in an idle state selects an appropriate cell from some candidates for the cell (S101). Then, the mobile station receives broadcast information (SIB1) from a base station (eNB) corresponding to the cell (S103). In a network sharing environment, the broadcast information includes a list (PLMN ID list) of identifiers indicating a plurality of operators sharing the network.

After establishing an RRC connection with the base station, the mobile station transmits a NAS Attach Request to the base station to request an attach to an MME (S105). At this point of time, the mobile station transitions from the idle state to a connected state (S107). The base station transmits an S1AP Initial UE Message to the MME to notify the MME of the attach request from the mobile station (S109). When the MME accepts the attach, the MME transmits to the base station an S1AP Initial Context Setup Request including an R-PLMN ID indicating an operator with which the mobile station registers (S111). The base station notifies the mobile station of the R-PLMN by means of an RRC Connection Reconfiguration (S113). When the mobile station receives the RRC Connection Reconfiguration, the mobile station identifies the R-PLMN ID (S115). Then, the mobile station transmits an RRC Connection Reconfiguration Complete to the base station to notify the base station of the completion of the configuration in the mobile station (S117), and the base station transmits an S1AP Initial Context Setup Complete to the MME (S119).

A similar procedure is performed in the case of cell reselection (TAU) as the movement of the mobile station. In this manner, the R-PLMN ID indicating the operator with which the mobile station registers is provided to the mobile station in the procedure of cell selection or cell reselection.

Upon receiving a release of the connection (RRC Connection Release) from the base station, the mobile station transitions from the connected state to the idle state (S121). The mobile station maintains the R-PLMN even in the idle state.

When the base station applies restriction control due to network congestion or the like, the base station transmits broadcast information (SIB2 or the like) including a restriction control parameter (S125). The broadcast information includes an ACB parameter (a restriction rate, a restriction time, or the like) and an SCM parameter set.

The mobile station identifies an SCM parameter set corresponding to the operator with which the mobile station registers and determines whether to apply restriction control (S127). As shown in FIG. 3A, when broadcast information including SCM parameters with one-to-one correspondence to PLMN IDs is received, the mobile station identifies an SCM parameter set corresponding to the R-PLMN ID and determines whether the call is the type of the call to which ACB is not applied. As shown in FIG. 3B, when broadcast information including only one SCM parameter set is received, the mobile station identifies the SCM parameter set and determines whether the call is the type of the call to which ACB is not applied. As shown in FIG. 3C, when broadcast information including a common SCM parameter set is received, the mobile station identifies the common SCM parameter set and determines whether the call is the type of the call to which ACB is not applied.

When the call originating from the mobile station is not the type of call to which restriction control is not applied, the mobile station transmits a connection request (RRC Connection Request) to the base station. After an RRC connection is established with the base station, the mobile station transmits a NAS service request to the base station to request start of a service to the MME (S129). At this point of time, the mobile station transitions from the idle state to the connected state (S131). The base station transmits an S1AP Initial UE Message to the MME to notify the MME of the service request from the mobile station (S133). When the MME accepts the service request, the MME transmits an S1AP UE Context Setup Request to the base station including information used to establish a bearer (S135). The base station notifies the mobile station of the information used to establish the bearer by means of an RRC Connection Reconfiguration (S137). When the mobile station receives the RRC Connection Reconfiguration, the mobile station transmits an RRC Connection Reconfiguration Complete to the base station upon the completion of the configuration in the mobile station (S139). The base station transmits an S1AP Initial Context Setup Complete to the MME (S141). With this procedure, the bearer is established (S143).

Broadcast information shown in FIGS. 3A-3C may be expressed as shown in FIG. 7. FIG. 7 is a diagram illustrating an example of broadcast information for providing an SCM parameter list. In SIB2 in the broadcast information, scm-ParameterSetCommon-r12 indicating an SCM parameter set to be applied in common to a plurality of operators and scm-ParameterSetList-r12 indicating an SCM parameter set to be applied to each operator are defined. To define broadcast information as shown in FIG. 3A, a plurality of sets of scm-ParameterSetList-r12 corresponding to the number of operators in a network sharing environment are defined, and an SCM parameter set for each operator is defined in SCM-ParameterSet in scm-ParameterSetList-r12. To define broadcast information as shown in FIG. 3B, one set of scm-ParameterSetList-r12 is defined, and an SCM parameter set which is common to the plurality of operators is defined in SCM-ParameterSet in scm-ParameterSetList-r12. To define broadcast information as shown in FIG. 3C, one set of scm-ParameterSetList-r12 and a plurality sets of scm-ParameterSetList-r12 corresponding to the number of operators in a network sharing environment are defined, an SCM parameter set which is common to the plurality of operators is defined in SCM-ParameterSet in the former scm-ParameterSetList-r12 and an SCM parameter set for each operator is defined in SCM-ParameterSet in the latter scm-ParameterSetList-r12.

Effects of an Embodiment of the Present Invention

According to an embodiment of the present invention, it is possible to apply restriction control in a network sharing environment either independently by each of a plurality of operators or in common by the plurality of operators.

In the network sharing environment, there is a need to give permission to perform SMS communication only, MMTEL Voice only, or the like depending on an operator. According to an embodiment of the present invention, an SCM parameter set can be defined for each operator, and thus different restriction control can be applied depending on an operator.

On the other hand, there is also a need for an operator managing a RAN to apply restriction control to all the operators sharing the RAN. According to an embodiment of the present invention, only one SCM parameter set or a common SCM parameter set can be defined, and thus restriction control which is common to all the operators can be applied.

For convenience of explanation, the base station and the mobile station according to the embodiments of the present invention have been described with reference to functional block diagrams, but the base station and the mobile station may be implemented in hardware, software, or combinations thereof. In addition, two or more functional elements may be combined as appropriate. The method according to the embodiments of the present invention may be carried out in a different order from the order shown in the embodiments.

While the approaches are described above to apply restriction control in a network sharing environment either independently by each of a plurality of operators or in common by the plurality of operators, the present invention is not limited to the embodiments, but various modifications and applications can be made by those skilled in the art within the scope of the claims.

The present international application is based on and claims the benefit of priority of Japanese Patent Application No. 2014-161812 filed on Aug. 7, 2014, the entire contents of which are hereby incorporated by reference.

DESCRIPTION OF NOTATIONS

10 base station
101 transmission and reception unit
103 connection management unit
105 restriction control unit
107 broadcast information generation unit
20 mobile station
201 transmission and reception unit
203 application unit
205 connection management unit
207 restriction control determination unit

The invention claimed is:

1. A mobile station for receiving broadcast information for restriction control from a base station in a network environment shared by a plurality of operators, comprising:
    a receiver configured to receive from the base station the broadcast information including at least one of restriction control skip information indicating a type of a call which is not subject to restriction control for each of the plurality of operators and restriction control skip information indicating a type of a call which is not subject to restriction control to be applied in common to the plurality of operators; and
    a processor configured to, when the received broadcast information includes the restriction control skip information for each of the plurality of operators, identify restriction control skip information corresponding to an operator with which the mobile station registers from the restriction control skip information for each of the plurality of operators and determine whether to apply the restriction control, and when the received broadcast information includes the restriction control skip information to be applied in common to the plurality of operators, identify the restriction control skip information to be applied in common to the plurality of operators and determines whether to apply the restriction control,
    wherein the restriction control skip information for each of the plurality of operators and the restriction control skip information to be applied in common to the plurality of operators are provided using the same broadcast information, and
    the restriction control skip information for each of the plurality of operators is associated with each operator included in an operator list provided using broadcast information.

2. A restriction control method in a mobile station for receiving broadcast information for restriction control from a base station in a network environment shared by a plurality of operators, comprising the steps of:
    receiving from the base station the broadcast information including at least one of restriction control skip information indicating a type of a call which is not subject to restriction control for each of the plurality of operators and restriction control skip information indicating a type of a call which is not subject to restriction control to be applied in common to the plurality of operators; and
    when the received broadcast information includes the restriction control skip information for each of the plurality of operators, identifying restriction control skip information corresponding to an operator with which the mobile station registers from the restriction control skip information for each of the plurality of operators and determining whether to apply the restriction control, and when the received broadcast information includes the restriction control skip information to be applied in common to the plurality of operators, identifying the restriction control skip information to be applied in common to the plurality of operators and determining whether to apply the restriction control,
    wherein the restriction control skip information for each of the plurality of operators and the restriction control skip information to be applied in common to the plurality of operators are provided using the same broadcast information, and the restriction control skip information for each of the plurality of operators is associated with each operator included in an operator list provided using broadcast information.

3. A base station for transmitting broadcast information for restriction control to a mobile station in a network environment shared by a plurality of operators, comprising:
a processor configured to generate the broadcast information including restriction control skip information indicating a type of a call which is not subject to restriction control for each of the plurality of operators and restriction control skip information indicating a type of a call which is not subject to restriction control to be applied in common to the plurality of operators; and
a transmitter configured to transmit the generated broadcast information,
wherein the restriction control skip information for each of the plurality of operators and the restriction control skip information to be applied in common to the plurality of operators are provided using the same broadcast information, and
the restriction control skip information for each of the plurality of operators is associated with each operator included in an operator list provided using broadcast information.

4. A broadcast information transmission method in a base station for transmitting broadcast information for restriction control to a mobile station in a network environment shared by a plurality of operators, comprising the steps of:
generating the broadcast information including restriction control skip information indicating a type of a call which is not subject to restriction control for each of the plurality of operators and restriction control skip information indicating a type of a call which is not subject to restriction control to be applied in common to the plurality of operators; and
transmitting the generated broadcast information,
wherein the restriction control skip information for each of the plurality of operators and the restriction control skip information to be applied in common to the plurality of operators are provided using the same broadcast information, and
the restriction control skip information for each of the plurality of operators is associated with each operator included in an operator list provided using broadcast information.

* * * * *